US005682407A

United States Patent [19]

Funaki

[11] Patent Number: 5,682,407

[45] Date of Patent: Oct. 28, 1997

[54] VOICE CODER FOR CODING VOICE SIGNAL WITH CODE-EXCITED LINEAR PREDICTION CODING

[75] Inventor: Keiichi Funaki, Tokyo, Japan

[73] Assignee: NEC Corporation, Tokyo, Japan

[21] Appl. No.: 625,544

[22] Filed: Apr. 1, 1996

[30] Foreign Application Priority Data

Mar. 31, 1995 [JP] Japan .................................. 7-075109

[51] Int. Cl.$^{6}$ .................................................. H04B 1/66

[52] U.S. Cl. ........................................ 375/240; 395/2.32

[58] Field of Search .................................. 375/240, 241, 375/242, 244, 245, 377; 381/29, 35, 36, 37, 34, 100, 101; 348/403, 414; 395/2, 2.32, 2.28

[56] References Cited

U.S. PATENT DOCUMENTS

| | | | |
|---|---|---|---|
| 4,817,157 | 3/1989 | Gerson | 381/40 |
| 5,327,519 | 7/1994 | Haggvist et al. | 395/2.28 |
| 5,371,544 | 12/1994 | Jacquin et al. | 375/240 |
| 5,485,581 | 1/1996 | Miyano et al. | 395/2.32 |
| 5,598,504 | 1/1997 | Miyano | 395/2.31 |
| 5,602,961 | 2/1997 | Kolesnik et al. | 395/2.32 |

OTHER PUBLICATIONS

M.R. Schroeder and B.S. Atal: "Code-Excited Linear Prediction (CELP): High-Quality Speech at Low Bit Rates", in Proc. of International Conference on Acoustics, Speech and Signal Processing (ICASSP) '85, pp. 937–940, 1985.

*Primary Examiner*—Tesfaldet Bocure

*Attorney, Agent, or Firm*—Helfgott & Karas, P.C.

[57] ABSTRACT

A voice coder for coding a speech signal at a low bit rate with high speech quality and improved efficiency for gain quantization according to code-excited linear prediction (CELP) coding. The voice coder has an LPC (linear prediction coding) analyzer for calculating LPC coefficients, a parameter quantizer for quantizing the LPC coefficients to output a quantized code CL, an adaptive codebook, a long-term predicting circuit for searching the adaptive codebook to determine a delay code CD and an adaptive code vector, an excitation codebook, an excitation codebook searching circuit for determining an optimum quantized code CS and an excitation vector, and a gain codebook searching circuit for outputting a gain code CG by determining quantized gains representing quantized vectors of gains of the adaptive code vector and the excitation vector. The gain codebook searching circuit has a plurality of gain codebooks each for storing quantized gains corresponding to one of searching ranges divided by predetermined ranges with respect to the value of a searching parameter, and gain codebook selector for selecting one of the gain codebooks depending on the value of the searching parameter. The gain code CG is determined by using the gain codebook selected by the gain codebook selector.

18 Claims, 8 Drawing Sheets

VOICE CODER FOR CODING VOICE SIGNAL WITH CODE-EXCITED LINEAR PREDICTION CODING

BACKGROUND OF THE INVENTION

1. Field of the Invention

The present invention relates to a voice coder, and more particularly to a voice coder for coding a speech signal at a low bit rate with high quality according to code-excited linear prediction (CELP) coding.

2. Description of the Prior Art

Telephone systems which employ radio waves as a medium for transmitting speech signals, e.g., mobile radio systems and cordless telephone systems, have recently been subjected to intensive efforts to convert speech signals into digital signals for transmission. Since frequency resources that can be assigned to such radio telephone systems are limited, it is important to develop a coding process capable of coding a speech signal at a low bit rate in order to reduce a frequency band that is occupied by one telephone communication channel. One known voice coding process having a bit rate ranging from 4 to 8 k-bits/second is a code-excited linear prediction (CELP) coding process described in, for example, M. Schroeder and B. S. Atal, "Code-excited linear prediction: High quality speed at low bit rates," ICASSP '85 Proceedings, pp. 937–940, (1985).

A conventional voice coder which operates based on the CELP process codes a speech signal at a transmission site as follows:

In each frame of a speech signal to be coded, e.g., in every 20 ms, a short-term prediction code representing frequency characteristics of the speech signal is extracted from the speech signal. This process is referred to as short-term prediction. Then, the frame is divided into smaller subframes each 5 ms long, for example. In each of the subframes, a pitch parameter representing a long-interval correlation (pitch correlation) is extracted from a past excitation signal, and a long-term prediction of the speech signal in the subframe is carried out based on the extracted pitch parameter.

The long-term prediction is effected using an adaptive codebook of adaptive code vectors. The adaptive code vectors are subframe-long excitation signals which have been produced by delaying the past excitation signal by delay samples corresponding to respective delay codes. In the long-term prediction, delay codes indicative of pitch correlations are determined as follows: The delay codes are varied by the size of the adaptive codebook, and adaptive code vectors corresponding to the respective delay codes are extracted. Thereafter, a synthetic signal is generated using the extracted adaptive code vectors, and an error power between the synthetic signal and the speech signal is calculated. Then, there are determined an optimum delay code which minimizes the calculated error power, an adaptive code vector corresponding to the optimum delay code, and a gain ga of the adaptive code vector.

Next, a codebook of noise signals which are quantized codes of predetermined types, i.e., an excitation codebook, is used, and a synthetic signal is generated from an excitation vector extracted from the excitation codebook. Then, there are determined an excitation vector at the time an error power between the synthetic signal from the excitation vector and a residual signal determined from the long-term prediction, and a gain ge of the excitation vector. This process is referred to as an excitation codebook search. In this process, one type of gain codebook is used, and one gain code is determined from that one type of gain codebook.

According to CELP voice coding, indexes representative of the types of the adaptive code vectors and the excitation vectors thus determined, and indexes representative of the types of the gains and the spectral parameters of the respective excitation signals are transmitted.

The length of bits required to scalar-quantize the gain ga of the adaptive code vector and the gain ge of the excitation vector total roughly 11 bits. In order to shorten the length of quantizing bits, it is the general practice to regard the gains ga, ge as two-dimensional vectors for gain quantization, and quantize them by way of 7-bit two-dimensional vector quantization. Using the adaptive code vector aL[n] the excitation vector ej[n] that have already been determined, a gain code for minimizing parameter $E_i$ of the following equation is determined:

$$E_i = \sum_{n=0}^{Ns-1} [z[n] - ga_i \cdot HaL[n] - ge_i \cdot Hej[n]]^2 \quad (1)$$

where Ns represents a subframe length, H a matrix for realizing a synthetic filter, L a delay code, j a quantized code, n a sample value, z[n] a speech signal relative to the sample value n, aL[n] an adaptive code vector of the delay code L, ej[n] an excitation vector of the quantized code j, $ga_i$ the gain of an adaptive code vector of an index i, and $ge_i$ the gain of an excitation vector of the index i.

A system which comprises a voice coder and a corresponding voice decoder connected to the voice coder by a transmission path will be referred to as a voice coding system. FIG. 1 of the accompanying drawings shows a general arrangement of a conventional CELP voice coding system. The conventional CELP voice coding system shown in FIG. 1 comprises a voice coder 1 for coding an input speech signal, a voice decoder 2 for decoding a coded speech signal into an output speech signal, and a transmission path 3 interconnecting the voice coder 1 and the voice decoder 2.

The voice coder 1 has a buffer 11 for storing a speech signal inputted from an input terminal TI. The speech signal stored in the buffer 11 is supplied to an LPC (linear prediction coding) analyzer 12 for extracting an LPC coefficient which is a spectral parameter of speech from the speech signal, and a weighting circuit 14 for perceptual weighting of the speech signal and outputting the weighted speech signal as a weighted signal SW. The voice coder 1 also has a parameter quantizer 13 for quantizing an LPC coefficient and outputting the quantized LPC coefficient as a quantized code CL. The quantized code CL is inverse-quantized for use in subsequent coding processing. The weighting circuit 14 weights the speech signal for auditory sensation with the quantized code CL which has been inverse-quantized.

Adaptive code vectors obtained from past excitation signals are stored in an adaptive codebook 15. Excitation vectors representing long-term prediction residuals and comprising subframe lengths are stored in an excitation codebook 17. The voice coder 1 also has a long-term predicting circuit 16, an excitation codebook searching circuit 18, a gain codebook searching circuit 19, and a multiplexer 41.

The long-term predicting circuit 16 is supplied with the weighted signal SW and the quantized signal CL, and determines a delay code CD representing a pitch correlation and searches the adaptive codebook 15 to determine an adaptive code vector corresponding to the determined delay code CD. The excitation codebook searching circuit 18 is also supplied with the weighted signal SW and the quantized signal CL, and searches the excitation codebook 17 to determine an optimum quantized signal CS and an excitation vector corresponding to the determined quantized signal CS. The gain codebook searching circuit 19, which has a gain codebook 180 shown in FIG. 2, is supplied with the weighted signal SW and the quantized signal CL, and determine a quantized gain of an adaptive code vector and an excitation vector from the gain codebook 180, and outputs the determined gain as a gain code CG. The multiplexer 41 combines the series of codes CL, CD, CS, CG into a transmission code CT, and outputs the transmission code CT to the transmission path 3.

The gain codebook searching circuit 19 will be described in greater detail with reference to FIG. 2 of the accompanying drawings. As shown in FIG. 2, the gain codebook searching circuit 19 has, in addition to the gain codebook 180, a gain code trial processor 191 for executing a gain code trial process, an evaluation function calculator 192 for calculating an evaluation function E expressed by the equation (1) using a gain code established by the gain codebook 180 and the gain code trial processor 191, and an optimum gain generator 193 for determining an optimum gain CG from evaluation functions corresponding to gain codes according to all trial processes and outputting the optimum gain CG. The gain code trial process is a trial procedure for varying a gain on a selected gain codebook by the size of the codebook. The gain codebook 180 is a vector quantization codebook for storing the gains of adaptive code vectors and excitation vectors as vectors. Specifically, the gain codebook 180 is a codebook representing the relationship between combinations (ga, ge) of the gains ga of adaptive code vectors and the gains ge of excitation vectors and gain codes CG. Since evaluation functions are determined by effecting the trial process on all the gain codes contained in the gain codebook 180, it is not necessary to determine the gains ga, ge individually prior to the determination of a gain code. Because the speech signal is weighted for auditory sensation, z[n] in the equation represents a speech signal which has been weighted for auditory sensation.

The voice decoder 2 comprises a demultiplexer 21 for decoding a transmission code CT inputted over the transmission path 3 into a predetermined series of codes (CL, CD, CS, CG), an adaptive codebook 22 for being supplied with the delay code CD and outputting an adaptive code vector, an excitation codebook 23 for being supplied with the quantized code CS and outputting an excitation vector, a gain calculating circuit 24 for being supplied with the gain code CG and calculating gains ga, ge corresponding to the adaptive code vector and the excitation vector, a multiplier 26 for multiplying the adaptive code vector by the gain ga, a multiplier 27 for multiplying the excitation vector by the gain ge, an adder 28 for calculating the sum of output signals from the multipliers 26, 27, and a synthetic filter 25 for reproducing a speech signal with the generated sound source and a voice synthesizing filter and outputting the reproduced speech signal to an output terminal TO. The synthetic filter 25 is supplied with the quantized code CL and the output signal from the adder 28. The adaptive codebook 22 and the excitation codebook 23 in the voice decoder 2 are identical to the adaptive codebook 15 and the excitation codebook 17, respectively, in the voice coder 1.

As shown in FIG. 3 of the accompanying drawings, the gain calculating circuit 24 has a gain codebook 250 which is identical to the gain codebook 180 in the voice coder 1, and a gain decoder 241 for decoding the gain code CG and outputting the gains ga, ge. A matrix for realizing the synthetic filter 25 is the matrix H in the equation (1).

A speech signal processing operation of the voice coding system will be described below. In the voice coder 1, a speech signal supplied from the input terminal TI is stored in the buffer 12. The LPC analyzer 12 effects a short-term predictive analysis on certain samples of the speech signal stored in the buffer 11 thereby to calculate an LPC coefficient of the speech signal. The LPC coefficient calculated by the LPC analyzer 12 is quantized by the parameter quantizer 13, and sent as the quantized code CL of the LPC coefficient to the multiplexer 41, and is also inverse-quantized for use in the subsequent coding processing. The weighting circuit 14 weights the speech signal stored in the buffer 11 for auditory sensation, using the quantized and inverse-quantized LPC coefficient. The weighted speech signal is supplied as the weighted signal SW to the long-term predicting circuit 16, the excitation codebook searching circuit 18, and the gain codebook searching circuit 19 for use in a subsequent codebook searching process.

Then, the codebook searching process is carried out for the weighted signal SW using the adaptive codebook 15, the excitation codebook 17, and the gain codebook 180. First, the long-term predicting circuit 16 effects a long-term prediction to determine the optimum delay code CD representing a pitch correlation, and transfers the delay code CD to the multiplexer 41 and generates a corresponding adaptive code vector aL[n]. After the effect of the generated adaptive code vector is subtracted from the weighted signal SW, the excitation codebook searching circuit 18 searches the excitation codebook 17 to determine the quantized code CS, generate the excitation vector ej[n], and transfer the quantized code CS to the multiplexer 41.

After the adaptive code vector aL[n] and the excitation vector ej[n] are determined, the gain code trial processor 191 in the gain codebook searching circuit 19 effects the gain code trial process, the evaluation function calculator 192 in the gain codebook searching circuit 19 calculates the evaluation function corresponding to each gain code according to the equation (1), and the optimum gain generator 193 in the gain codebook searching circuit 19 calculates optimum the gains $ga_i$, $ge_i$ with respect to these two sound sources (the adaptive code vector and the excitation vector) among all evaluation functions, thus determining the gain code CD. The gain code CD thus calculated is transferred to the multiplexer 41. Finally, the multiplexer 41 combines these codes CL, CD, CS, CG into the transmission code CT, and transmits the transmission code CT over the transmission path 3 to the voice decoder 2.

In the voice decoder 2, the demultiplexer 21 demultiplexes the transmission code CT supplied from the transmission path 3 into the codes CL, CD, CS, CG. The demultiplexer 21 decodes a filter coefficient with the quantized code CL corresponding to the LPC coefficient, and transfers the decoded filter coefficient to the synthetic filter 25. The adaptive code vector aL[n] is generated from the delay code CD by the adaptive codebook 22. The excitation vector ej[n] is generated from the quantized code CS by the excitation codebook 23. In the gain calculating circuit 24, the gain decoder 241 refers to the gain codebook 250 according to the supplied gain code CG to calculate the gains $ga_i$, $ge_i$ of the adaptive code vector aL[n] and the excitation vector ej[n], respectively. The multipliers 26, 27 multiply the respective vectors al[n], ej[n] by the gains $ga_i$, $ge_i$. The adder 28 adds output signals from the multipliers 26, 27 into a sum signal which is supplied as an input signal to the synthetic filter 25. The synthetic filter 25 synthesizes a speech signal in response to the quantized code CL and the input signal from the adder 28, and outputs the synthesized speech signal from the output terminal TO.

In the above conventional voice coding system, the gain $ga_i$ of the adaptive code vector aL[n] varies by a quantity which corresponds to the dynamic range of the inputted speech signal. However, it has been confirmed that the gain $ge_i$ of the excitation vector ej[n] varies by a small quantity. Since the dynamic ranges of the gains $ga_i$, $ge_i$ are considerably different from each other, the difference between the dynamic ranges of the gains $ga_i$, $ge_i$ cannot be absorbed even if both the gains $ga_i$, $ge_i$ are quantized while being regarded as a single vector. Therefore, when the gains $ga_i$, $ge_i$ are quantized with a small bit length, the quantizing efficiency is lowered, resulting in a reduction in the speech quality, if the speech signal has a large dynamic range. If the quantizing bit length is not reduced to avoid a reduction in the speech quality, then the bit rate and the amount of calculations for searching the gain codebook are increased, and the storage capacity of a ROM (Read-Only Memory) for storing the gain codebook is increased.

SUMMARY OF THE INVENTION

It is therefore an object of the present invention to provide a voice coder which will increase the efficiency of gain quantization and achieve a good speech quality at a low bit rate.

The above object can be accomplished by a voice coder comprising speech analyzing means for analyzing a speech signal having a predetermined frame length to generate a short-term prediction code representing frequency characteristics of the speech signal, an adaptive codebook for storing adaptive code vectors, long-term predicting means for effecting a long-term prediction to search for a delay code representing the periodicity of the speech signal and an adaptive code vector corresponding to the delay code, an excitation codebook for storing excitation vectors which are quantized codes representing residual signals after the long-term prediction, excitation codebook searching means for searching the excitation codebook to determine an optimum quantized code and an excitation vector corresponding to the optimum quantized code, and gain codebook searching means for determining quantized gains representing quantized vectors of gains of the adaptive code vectors and the excitation vectors, the gain codebook searching means comprising a plurality of gain codebooks each for storing quantized gains corresponding to one of a plurality of searching ranges divided by predetermined ranges with respect to the value of a searching parameter, and gain codebook selecting means for selecting one of the gain codebooks depending on the value of the searching parameter, wherein an optimum quantized gain is searched for to determine a gain code using the gain codebook selected by the gain codebook selecting means.

The voice coder according to the present invention employs a parameter, such as a delay code or an energy code, correlated to an adaptive code vector gain, as a searching parameter. The gain codebook searching means has a plurality of gain codebooks and each of the gain codebooks stores quantized gains corresponding to one of searching ranges divided by predetermined ranges with respect to the value of the searching parameter. The gain codebook selecting means selects one of the gain codebooks depending on the value of the searching parameter. By switching between the gain codebooks depending on the value of the searching parameter, the dynamic ranges of adaptive code vectors for the respective gain codebooks can be suppressed for thereby increasing the efficiency of gain quantization. As a result, the efficiency of a long-term predicting process and an excitation vector searching process increases and the quality of speech is improved. Since any degradation of the quality of speech is minimized even if a bit length for gain quantization is reduced, the bit rate, the storage capacity of a read-only memory for storing gain codebooks, and the amount of calculations for searching the gain codebooks are reduced. The above and other objects, features, and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
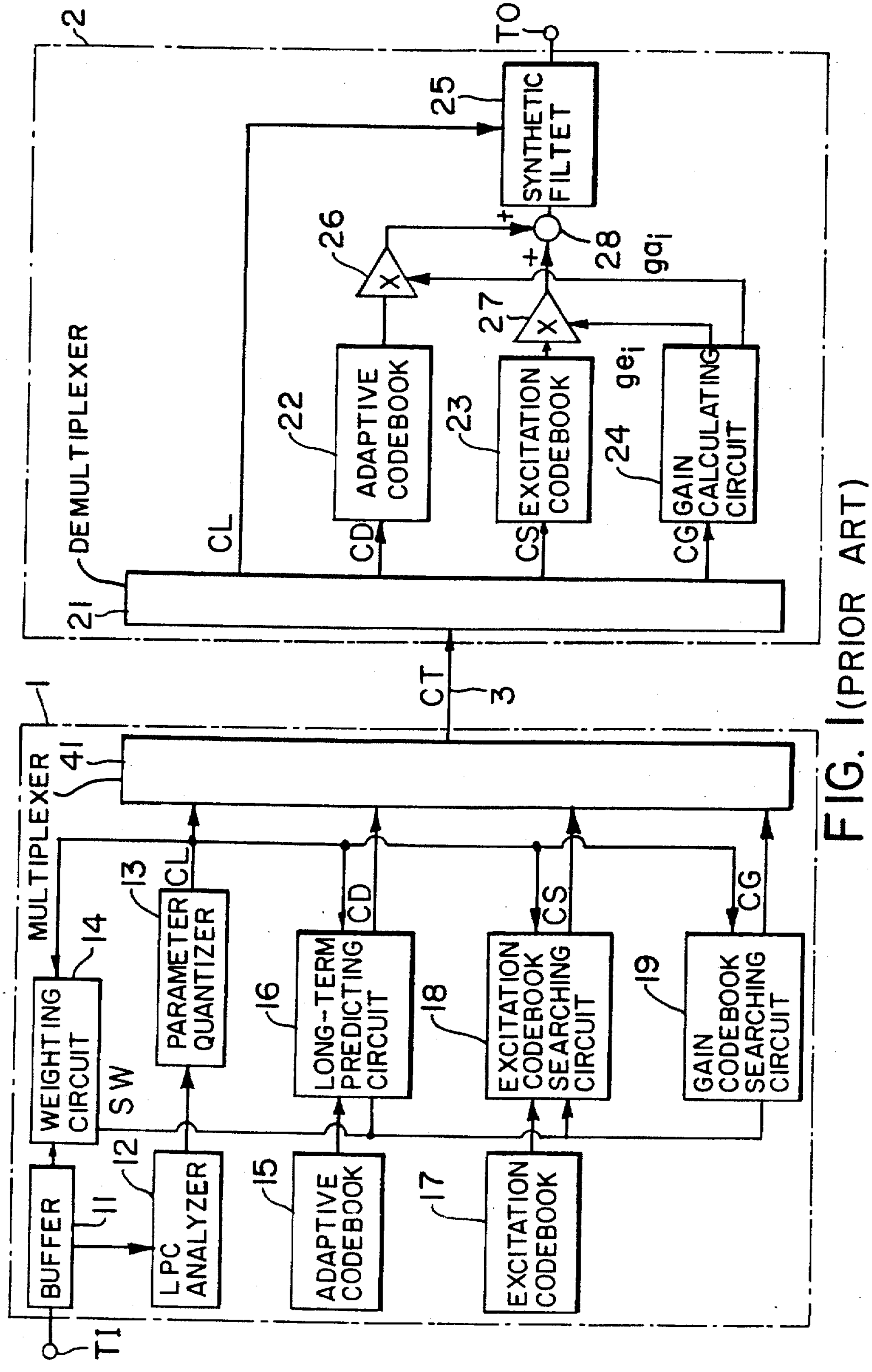
FIG. 1 (PRIOR ART)
FIG. 1 is a block diagram of a conventional CELP voice coding system.
Figure 4:
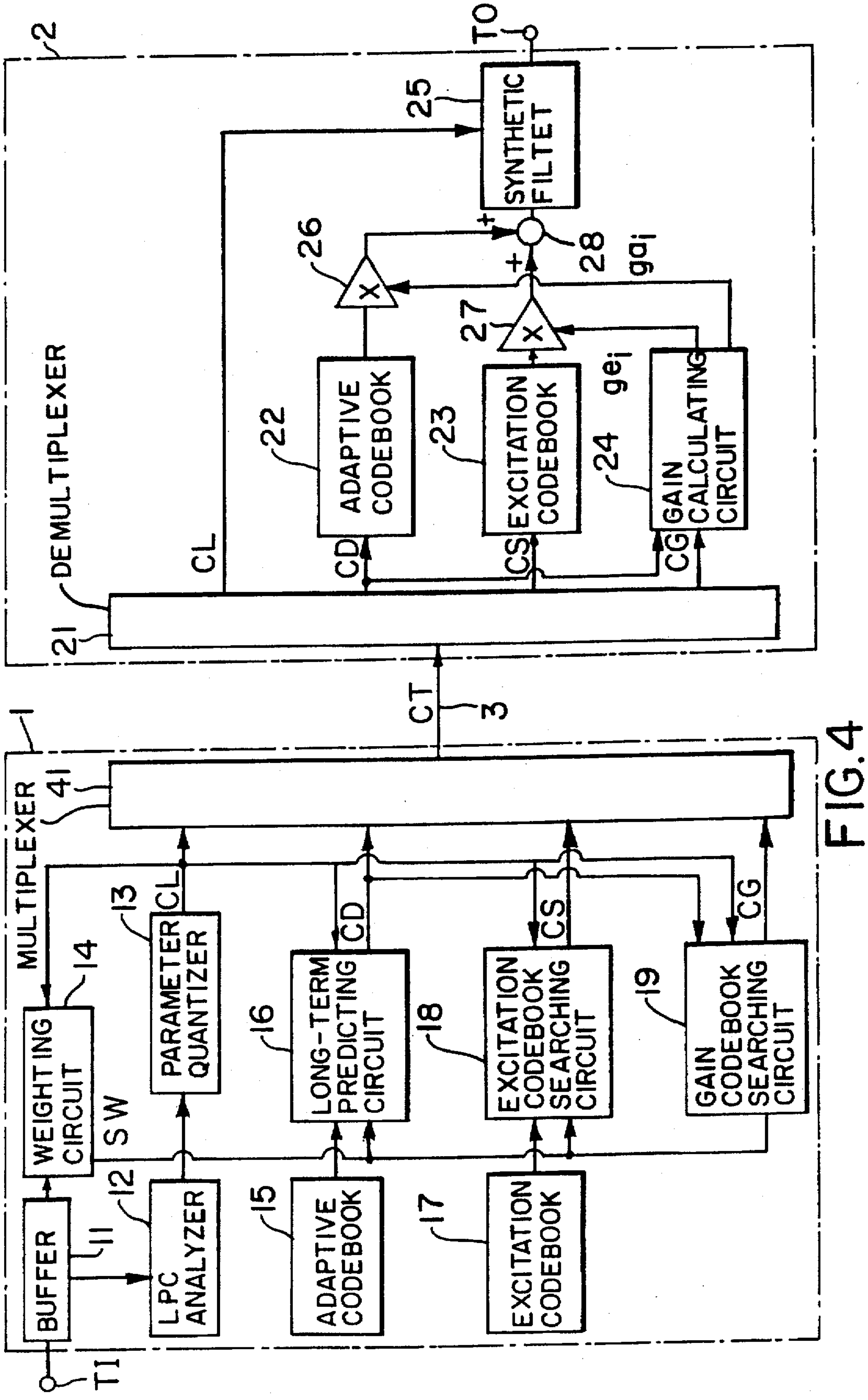
FIG. 4 is a block diagram of a voice coding system which incorporates a voice coder according to a first embodiment of the present invention.

A voice coding system shown in FIG. 4, which incorporates a voice coder according to a first embodiment of the present invention, differs from the conventional voice coding system shown in FIG. 1 with respect to a gain codebook searching circuit 19A in a voice coder 1 and a gain calculating circuit 24A in a voice decoder 2. Other details of the voice coding system shown in FIG. 4 are identical to those of the conventional voice coding system shown in FIG. 1, and are denoted by identical reference numerals and will not be described in detail below.

The gain codebook searching circuit 19A is supplied with the delay code CD from the long-term predicting circuit 16 as well as the weighted signal SW and the quantized code CL, and the gain calculating circuit 24A is supplied with the gain code CG and the delay code CD from the demultiplexer 21.

Figure 2:
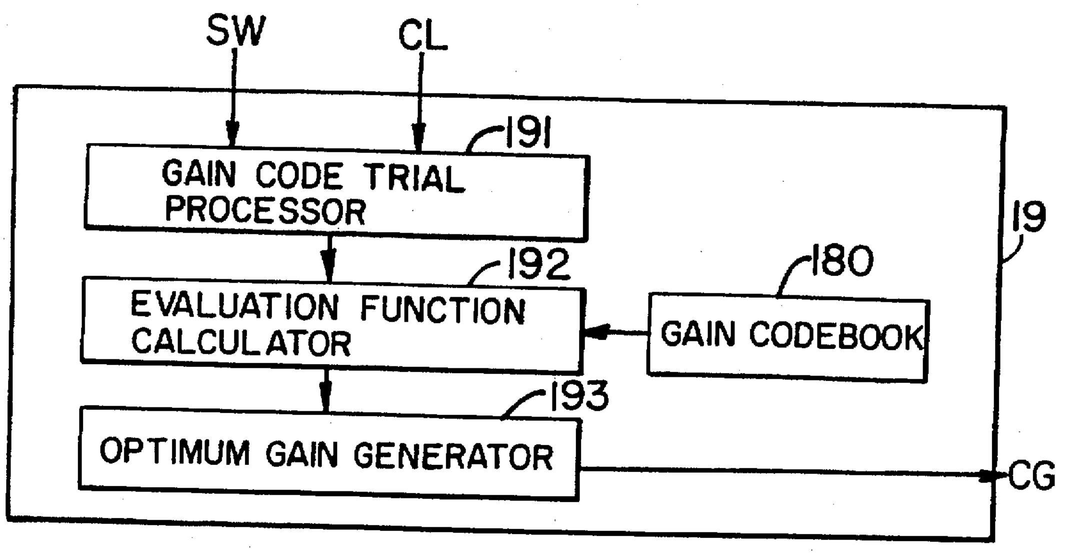
FIG. 2 (PRIOR ART)
FIG. 2 is a block diagram of a gain codebook searching circuit in the conventional CELP voice coding system shown in FIG. 1.
Figure 3:
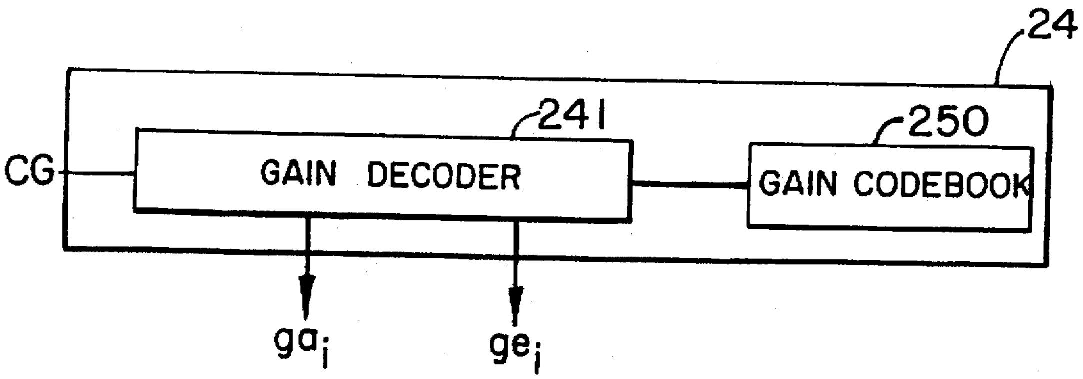
FIG. 3 (PRIOR ART)
FIG. 3 is a block diagram of a gain calculating circuit in the conventional CELP voice coding system shown in FIG. 1.
Figure 5:
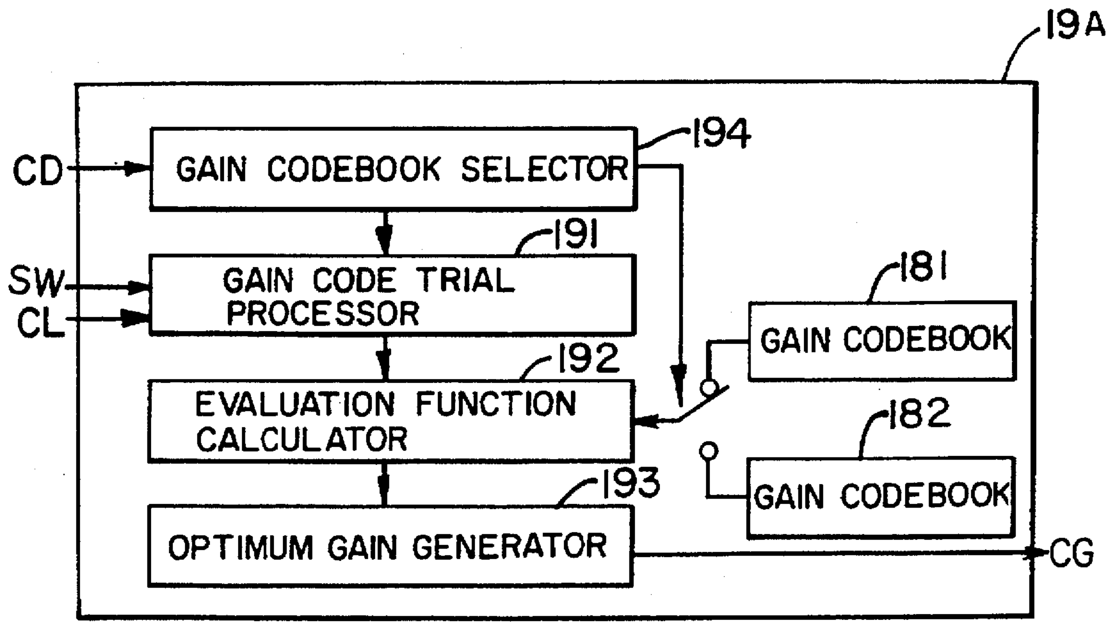
FIG. 5 is a block diagram of a gain codebook searching circuit in the voice coding system shown in FIG. 4.

As shown in FIG. 5, the gain codebook searching circuit 19A comprises two gain codebooks 181, 182, a gain code trial processor 191, an evaluation function calculator 192, an optimum gain generator 193, and a gain codebook selector 194. The gain codebook selector 194 serves to select either one of the two gain codebooks 181, 182 using the delay code CD that has been determined by the long-term predicting circuit 16. The gain code trial processor 191, the evaluation function calculator 192, and the optimum gain generator 193 are identical to those in the gain codebook searching circuit 19 shown in FIG. 2 in the conventional voice coding system, and effect the same searching process as the gain codebook searching circuit 19 shown in FIG. 2, using the gain codebook selected by the gain codebook selector 194. The two gain codebooks 181, 182 are selectively used depending on whether the delay value corresponding to the delay code CD is longer or shorter than a predetermined value. The gain codebooks 181, 182 correspond respectively to longer and shorter delay values, and store, as vectors, parameters representing the gains of adaptive code vectors and the gains of excitation vectors.

Figure 6:
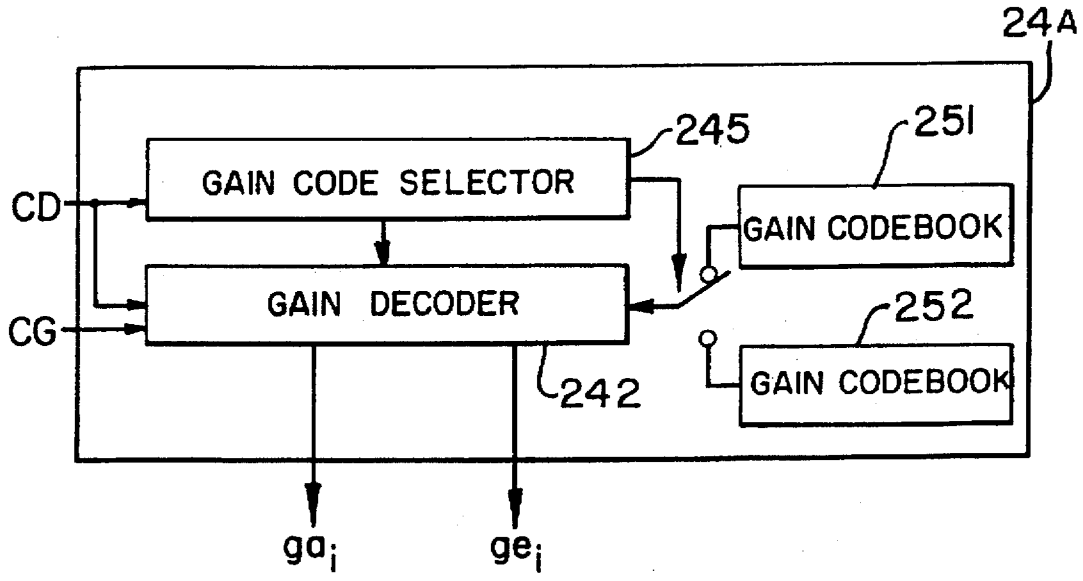
FIG. 6 is a block diagram of a gain calculating circuit in the voice coding system shown in FIG. 4.

As shown in FIG. 6, the gain calculating circuit 24A comprises two gain codebooks 251, 252 which are identical respectively to the gain codebooks 181, 182 in the gain codebook searching circuit 19A, a gain codebook selector 245 for selecting either one of the two gain codebooks 251, 252 depending on the delay code CD, and a gain decoder 242. The gain decoder 242 calculates the gains $ga_i$, $ge_i$ of an adaptive code vector and an excitation vector using a gain codebook selected by the gain codebook selector 245, based on the delay code CD and the gain code CG.

Operation of the voice coding system shown in FIGS. 4 through 6 primarily with regard to a gain coding process and a process for decoding the gain code CG will be described below.

In the voice coding system 1 shown in FIG. 4, a weighted code SW, quantized codes CL, CS, a delay code CD, an adaptive code vector aL[n], and an excitation vector ej[n] are calculated in the same manner as the conventional voice coding system shown in FIG. 1. Based on the delay code CD from the long-term predicting circuit 16, the gain codebook selector 194 in the gain codebook searching circuit 19A selects either one of the gain codebooks 181, 182 as a gain codebook to be searched depending on the length of a delay value corresponding to the delay code CD. In this embodiment, if the delay value corresponding to the delay code CD is shorter than the predetermined value, then the gain codebook selector 194 selects the gain codebook 181, and if the delay value corresponding to the delay code CD is longer than the predetermined value, then the gain codebook selector 194 selects the gain codebook 182. Using the selected gain codebook, the gain code trial processor 191 effects a gain code trial process, the evaluation function calculator 192 calculates an evaluation function corresponding to each gain code, and the optimum gain generator 193 calculates optimum gains $ga_i$, $ge_i$ among all evaluation functions, in the same manner as with the conventional voice coding system.

When the codes CL, CD, CS, CG are thus determined, the multiplexer 41 combines the codes CL, CD, CS, CG into a transmission code CT, which is transmitted over the transmission path 3 to the voice decoder 2.

In the voice decoder 2, the demultiplexer 21 demultiplexes the supplied transmission code CT into the codes CL, CD, CS, CG. In the gain calculating circuit 24A, the gain codebook selector 245 selects either one of the gain codebooks 251, 252 as a gain codebook to be searched depending on the length of the delay value corresponding to the delay code CD, in the same manner as with the gain codebook searching circuit 19A. In the gain calculating circuit 24A, the same gain codebook as the gain codebook selected in the gain codebook searching circuit 19A is selected. Using the selected gain codebook, the gain decoder 242 calculates the gains $ga_i$, $ge_i$ of the adaptive code vector and the excitation vector, respectively, from the delay code CD and the gain code CG. Thereafter, in the same manner as shown in FIG. 1, the adaptive code vector outputted from the adaptive codebook 22 is multiplied by the gain $ga_i$, and the excitation vector outputted from the excitation codebook 23 is multiplied by the gain $ge_i$. Then, the synthetic filter 25 synthesizes a speech signal from the products.

Second Embodiment

Figure 7:
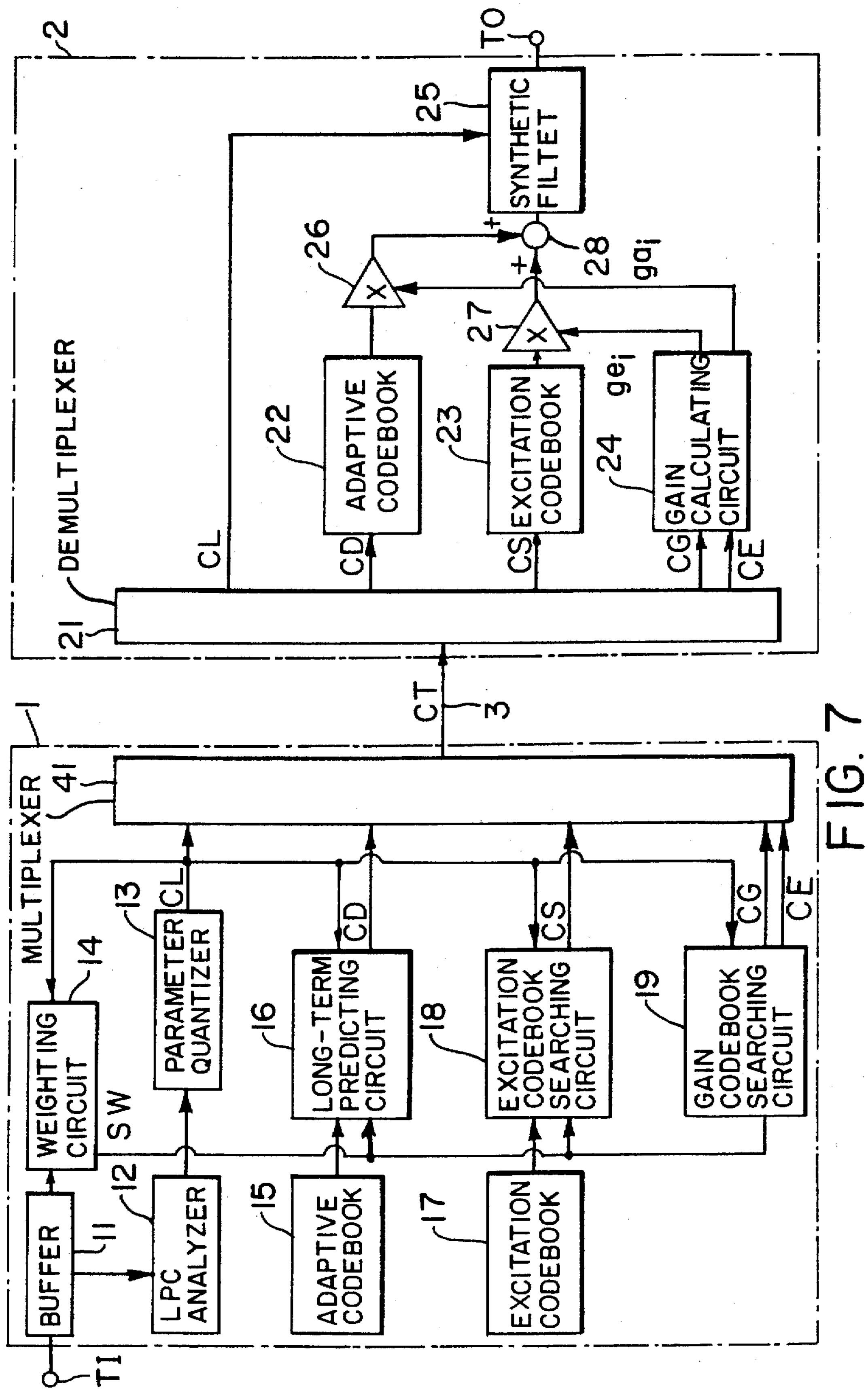
FIG. 7 is a block diagram of a voice coding system which incorporates a voice coder according to a second embodiment of the present invention.

A voice coding system shown in FIG. 7, which incorporates a voice coder according to a second embodiment of the present invention, differs from the conventional voice coding system shown in FIG. 1 with respect to a gain codebook searching circuit 19B in a voice coder 1 and a gain calculating circuit 24B in a voice decoder 2. Other details of the voice coding system shown in FIG. 7 are identical to those of the conventional voice coding system shown in FIG. 1, and are denoted by identical reference numerals and will not be described in detail below.

The gain codebook searching circuit 19B outputs the gain code CG as well as an energy code CE to the multiplexer 41, which generates a transmission signal including the energy code CE. The gain calculating circuit 24B is supplied with the gain code CG and the energy code CE from the demultiplexer 21.

Figure 8:
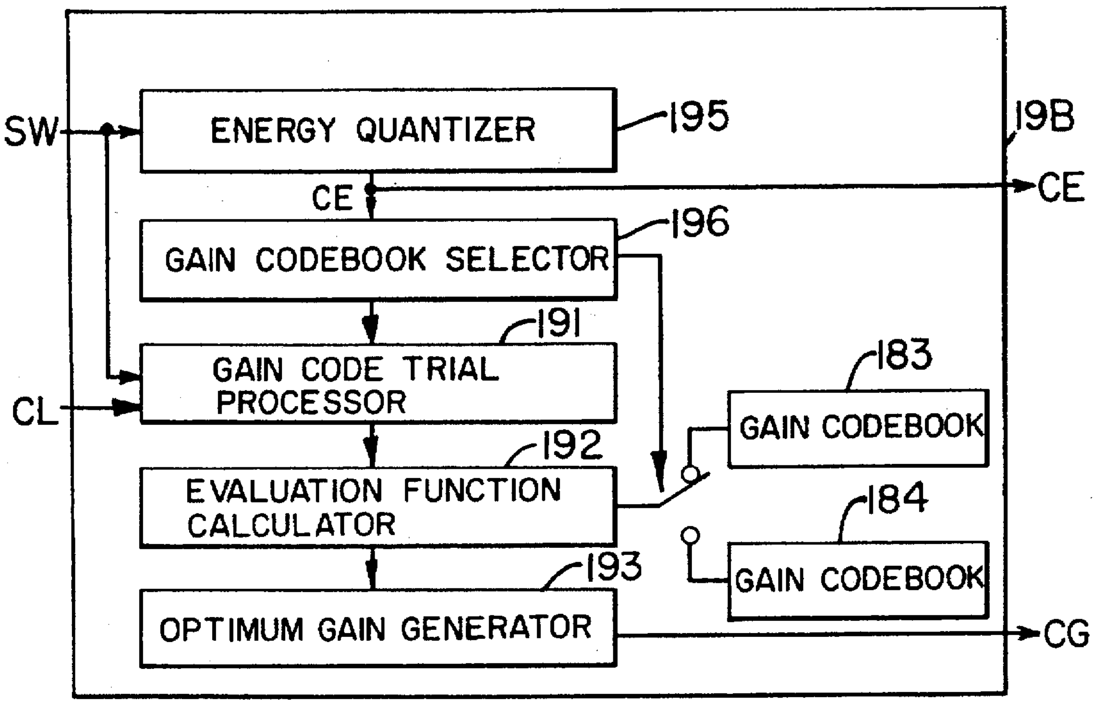
FIG. 8 is a block diagram of a gain codebook searching circuit in the voice coding system shown in FIG. 7.

As shown in FIG. 8, the gain codebook searching circuit 19B comprises two gain codebooks 183, 184, a gain code trial processor 191, an evaluation function calculator 192, an optimum gain generator 193, an energy quantizer 195, and a gain codebook selector 196. The energy quantizer 195 quantizes the energy of the weighted signal SW thereby to output the energy code CE. Using the energy code CE generated by the energy quantizer 195, the gain codebook selector 196 selects either one of the two gain codebooks 183, 184. The gain code trial processor 191, the evaluation function calculator 192, and the optimum gain generator 193 are identical to those in the gain codebook searching circuit 19 shown in FIG. 2 in the conventional voice coding system, and effect the same gain searching process as the gain codebook searching circuit 19 shown in FIG. 2, using the gain codebook selected by the gain codebook selector 196. The two gain codebooks 183, 184 are selectively used depending on whether the energy value is larger or smaller than a predetermined value. The gain codebooks 183, 184 store, as vectors, parameters representing the gains of adaptive code vectors and the gains of excitation vectors.

Figure 9:
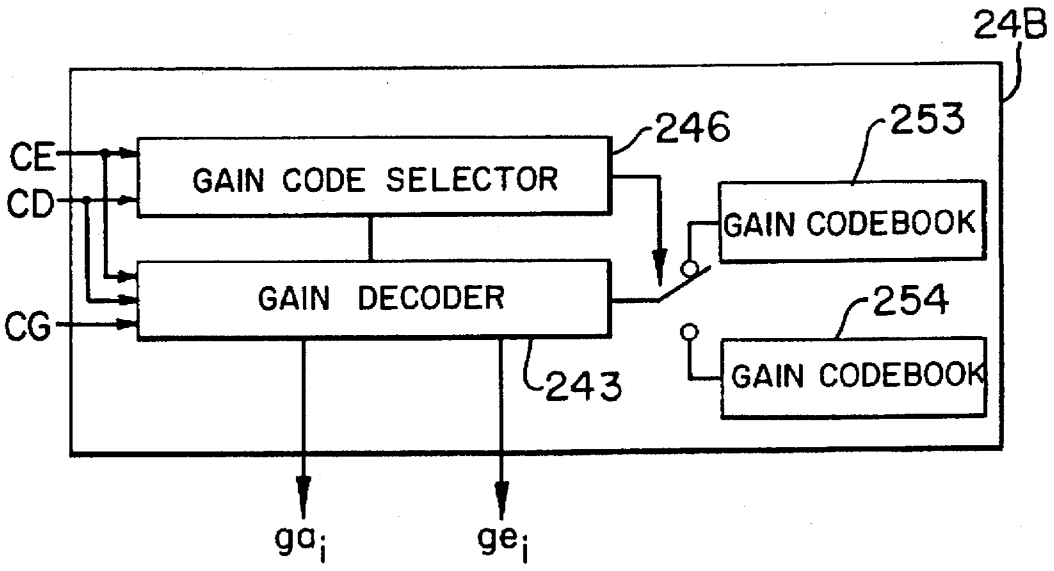
FIG. 9 is a block diagram of a gain calculating circuit in the voice coding system shown in FIG. 7.

As shown in FIG. 9, the gain calculating circuit 24B comprises two gain codebooks 253, 254 which are identical respectively to the gain codebooks 183, 184 in the gain codebook searching circuit 19B, a gain codebook selector 246 for selecting either one of the two gain codebooks 253, 254 depending on the energy code CE, and a gain decoder 243. The gain decoder 243 calculates the gains $ga_i$, $ge_i$ of an adaptive code vector and an excitation vector, using the gain codebook selected by the gain codebook selector 246, based on the gain code CG.

Operation of the voice coding system shown in FIGS. 7 through 9 primarily with regard to a gain coding process and a process for decoding the gain code CG will be described below.

In the voice coding system 1 shown in FIG. 7, a weighted code SW, quantized codes CL, CS, a delay code CD, an adaptive code vector aL[n], and an excitation vector ej[n] are calculated in the same manner as the conventional voice coding system shown in FIG. 1. The energy quantizer 195 in the gain codebook searching circuit 19B quantizes the energy of the weighted signal SW thereby to output an energy code CE. The energy code CE is outputted to the multiplexer 41 and supplied to the gain codebook selector 196. The gain codebook selector 196 selects either one of the gain codebooks 183, 184 as a gain codebook to be searched depending on whether an energy value represented by the energy code CE is greater or smaller than the predetermined value. If the energy value represented by the energy code CE is smaller than the predetermined value, then the gain codebook selector 196 selects the gain codebook 183, and if the energy value represented by the energy code CE is greater than the predetermined value, then the gain codebook selector 196 selects the gain codebook 184. Using the selected gain codebook, the gain code trial processor 191 effects a gain code trial process, the evaluation function calculator 192 calculates the evaluation function corresponding to each gain code, and the optimum gain generator 193 calculates optimum gains $ga_i$, $ge_i$ among all evaluation functions, in the same manner as with the conventional voice coding system.

When the codes CL, CD, CS, CG, CE are thus determined, the multiplexer 41 combines the codes CL, CD, CS, CG, CE into a transmission code CT, which is transmitted over the transmission path 3 to the voice decoder 2.

In the voice decoder 2, the demultiplexer 21 demultiplexes the supplied transmission code CT into the codes CL, CD, CS, CG, CE. In the gain calculating circuit 24B, the gain codebook selector 246 selects either one of the gain codebooks 253, 254 as a gain codebook to be searched depending on the magnitude of the energy value represented by the energy code CE. The gain codebook to be searched corresponds to the gain codebook selected in the gain codebook searching circuit 19B. Using the selected gain codebook, the gain decoder 244 calculates the gains $ga_i$, $ge_i$ of the adaptive code vector and the excitation vector, respectively, from the gain code CG. Thereafter, in the same manner as shown in FIG. 1, the adaptive code vector outputted from the adaptive codebook 22 is multiplied by the gain $ga_i$, and the excitation vector outputted from the excitation codebook 23 is multiplied by the gain $ge_i$. Then, the synthetic filter 25 synthesizes a speech signal from the products.

Third Embodiment

Figure 10:
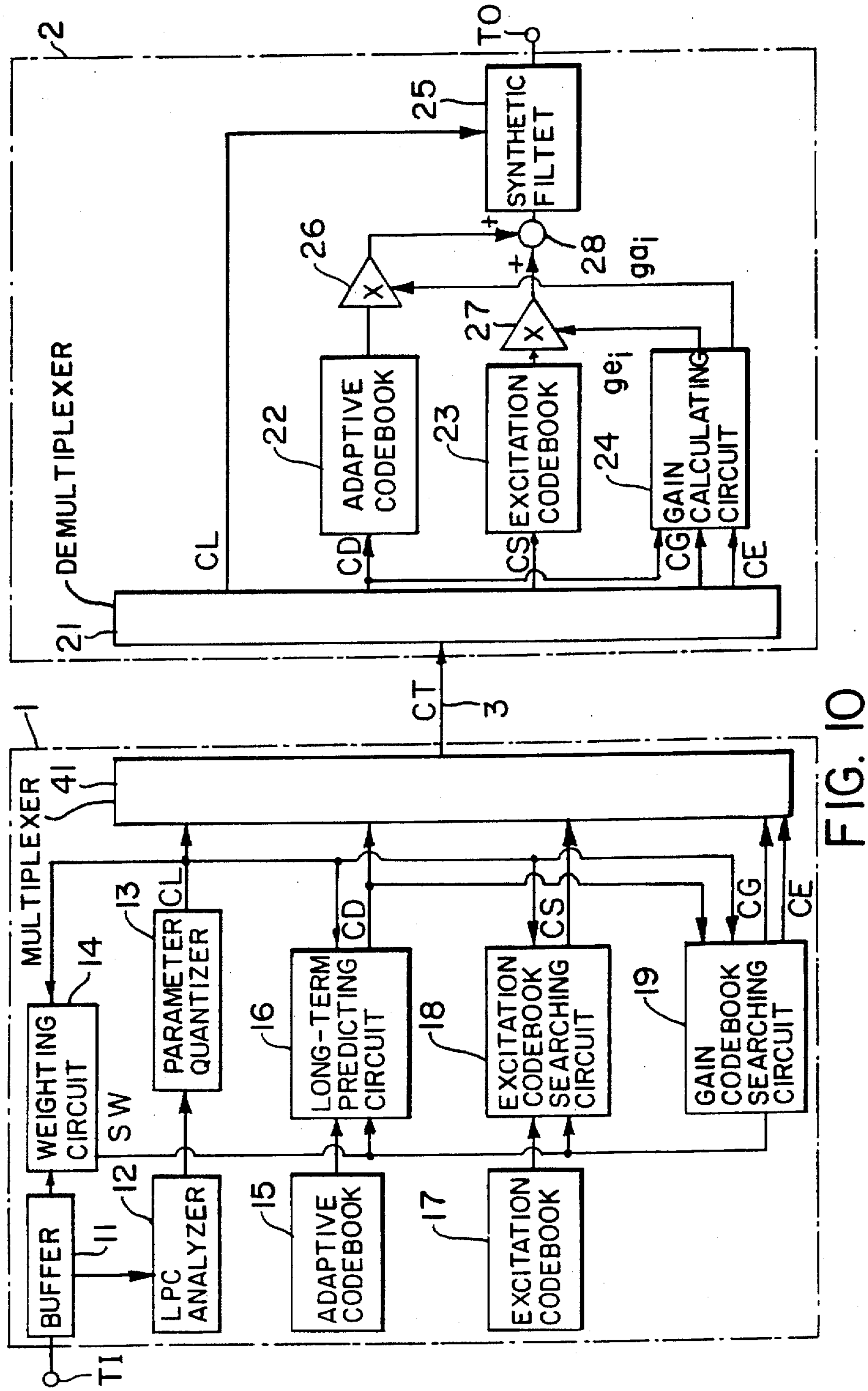
FIG. 10 is a block diagram of a voice coding system which incorporates a voice coder according to a third embodiment of the present invention.

A voice coding system shown in FIG. 10, which incorporates a voice coder according to a third embodiment of the present invention, differs from the conventional voice coding system shown in FIG. 1 with respect to a gain codebook searching circuit 19C in a voice coder 1 and a gain calculating circuit 24C in a voice decoder 2. Other details of the voice coding system shown in FIG. 10 are identical to those of the conventional voice coding system shown in FIG. 1, and are denoted by identical reference numerals and will not be described in detail below.

The gain codebook searching circuit 19C is supplied with the delay code CD from the long-term predicting circuit 16 as well as the weighted signal SW and the quantized code CL, and outputs an energy code CE as well as the gain code CG to the multiplexer 41, which generates a transmission signal including the energy code CE. The gain calculating circuit 24C is supplied with the gain code CG, the delay code CD, and the energy code CE from the demultiplexer 21.

Figure 11:
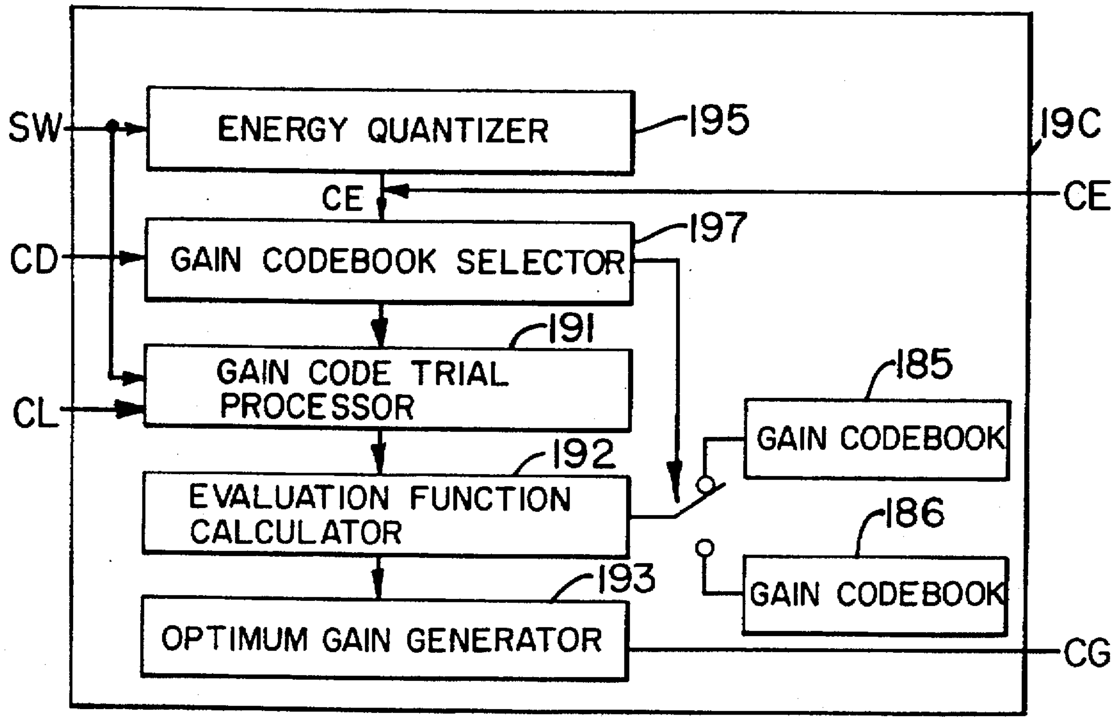
FIG. 11 is a block diagram of a gain codebook searching circuit in the voice coding system shown in FIG. 10.

As shown in FIG. 11, the gain codebook searching circuit 19C comprises two gain codebooks 185, 186, a gain code trial processor 191, an evaluation function calculator 192, an optimum gain generator 193, an energy quantizer 195, and a gain codebook selector 197. The energy quantizer 195 quantizes the energy of the weighted signal SW thereby to output the energy code CE. Using the delay code CD determined by the long-term predicting circuit 16 and the energy code CE generated by the energy quantizer 195, the gain codebook selector 197 selects either one of the two gain codebooks 185, 186. The gain code trial processor 191, the evaluation function calculator 192, and the optimum gain generator 193 are identical to those in the gain codebook searching circuit 19 shown in FIG. 2 in the conventional voice coding system, and effect the same gain searching process as the gain codebook searching circuit 19 shown in FIG. 2, using the gain codebook selected by the gain codebook selector 197. The two gain codebooks 185, 186 are selectively used depending on whether the energy value corresponding to the energy code CE is smaller than a first predetermined value and the delay value corresponding to the delay code CD is shorter than a second predetermined value, or otherwise. The gain codebooks 185, 186 store, as vectors, parameters representing the gains of adaptive code vectors and the gains of excitation vectors.

Figure 12:
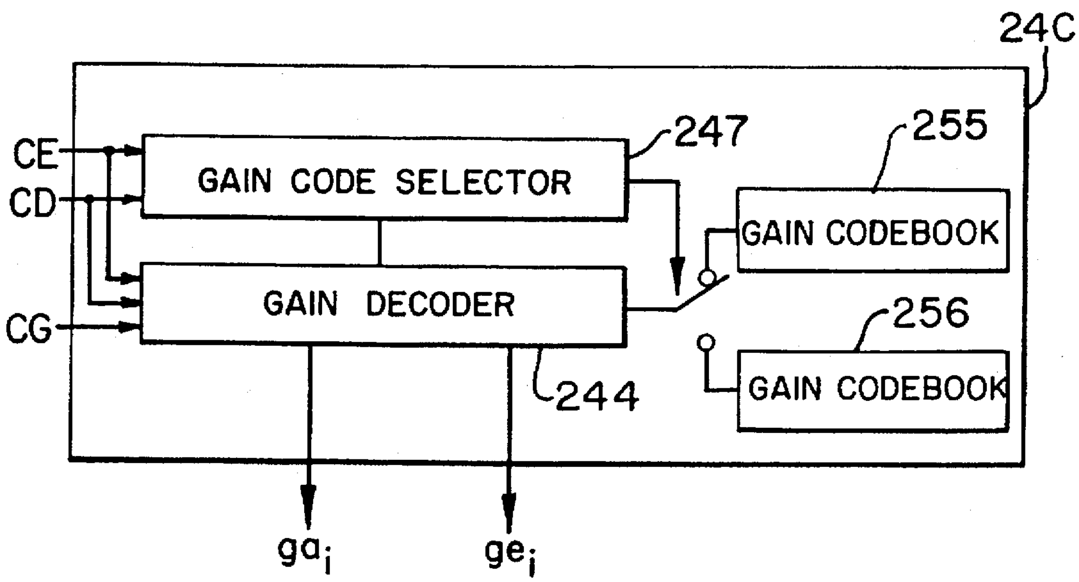
FIG. 12 is a block diagram of a gain calculating circuit in the voice coding system shown in FIG. 10.

As shown in FIG. 12, the gain calculating circuit 24C comprises two gain codebooks 255, 256 which are identical respectively to the gain codebooks 185, 186 in the gain codebook searching circuit 19C, a gain codebook selector 247 for selecting either one of the two gain codebooks 255, 256 depending on the energy code CE and the delay code CG, and a gain decoder 244. The gain decoder 244 calculates the gains $ga_i$, $ge_i$ of an adaptive code vector and an excitation vector, using the gain codebook selected by the gain codebook selector 247, based on the energy code CE, the delay code CD, and the gain code CG.

Operation of the voice coding system shown in FIGS. 10 through 12 primarily with regard to a gain coding process and a process for decoding the gain code CG will be described below.

In the voice coding system 1 shown in FIG. 10 a weighted code SW, quantized codes CL, CS, a delay code CD, an adaptive code vector aL[n], and an excitation vector ej[n] are calculated in the same manner as the conventional voice coding system shown in FIG. 1. The energy quantizer 195 in the gain codebook searching circuit 19C quantizes the energy of the weighted signal SW thereby to output an energy code CE. The energy code CE is outputted to the multiplexer 41 and supplied to the gain codebook selector 197, which is also supplied with delay code CD from the long-term predicting circuit 16. The gain codebook selector 197 selects either one of the gain codebooks 185, 186 as a gain codebook to be searched depending on an energy value represented by the energy code CE and a delay value represented by the delay code CD. If the energy value represented by the energy code CE is smaller than the first predetermined value and the delay value represented by the delay code CD is shorter than the second predetermined value, then the gain codebook selector 197 selects the gain codebook 185. Otherwise, the gain codebook selector 197 selects the gain codebook 186. Using the selected gain codebook, the gain code trial processor 191 effects the gain code trial process, the evaluation function calculator 192 calculates an evaluation function corresponding to each gain code, and the optimum gain generator 193 calculates the optimum gains $ga_i$, $ge_i$ among all evaluation functions, in the same manner as with the conventional voice coding system.

When the codes CL, CD, CS, CG, CE are thus determined, the multiplexer 41 combines the codes CL, CD, CS, CG, CE into a transmission code CT, which is transmitted over the transmission path 3 to the voice decoder 2.

In the voice decoder 2, the demultiplexer 21 demultiplexes the supplied transmission code CT into the codes CL, CD, CS, CG. In the gain calculating circuit 24C, the gain codebook selector 247 selects either one of the gain codebooks 255, 256 as a gain codebook to be searched depending on the magnitude of the energy value represented by the energy code CE and the magnitude of the delay value represented by the delay code CD. The gain codebook to be searched corresponds to the gain codebook selected in the gain codebook searching circuit 19C. Using the selected gain codebook, the gain decoder 244 calculates gains the $ga_i$, $ge_i$ of the adaptive code vector and the excitation vector, respectively, from the energy code CE, the delay code CD, and the gain code CG. Thereafter, in the same manner as shown in FIG. 1, the adaptive code vector outputted from the adaptive codebook 22 is multiplied by the gain $ga_i$, and the excitation vector outputted from the excitation codebook 23 is multiplied by the gain $ge_i$. Then, the synthetic filter 25 synthesizes a speech signal from the products.

While the present invention has been described with respect to the above specific embodiments, the present invention is not limited to the above embodiments, but may be modified in various ways.

For example, the evaluation function expressed by the equation (1) may be calculated in a expanded form rather than using the square error. The number of gain codebooks that can be selected, i.e., the number of gain codebooks contained in each of the gain codebook searching circuit and the gain calculating circuit, may be three or more. The order of the adaptive code vectors may be 2 or more, and the order of the gain vectors may be increased correspondingly. The excitation codebook searching circuit may be of a multiple-stage configuration, rather than a single-stage configuration, and the order of the gain vectors may be increased. For quantizing gains, normalized gains, rather than unnormalized gains, may be used. Rather than using two separate codebooks, one unified codebook may be employed, and a code selecting range may be limited. Even if one unified codebook is employed, insofar as a code selecting range is limited depending on a searching parameter and a different selecting range is established by a different searching parameter, the unified codebook may be regarded as being composed of a plurality of gain codebooks with each selecting range corresponding to one gain codebook.

For searching for a sound source, a multipath searching process, an impulse process, or a waveform coding process may be employed, rather than the process using excitation codebooks. A post filter or a pitch filter may be used for a decoding process.

The excitation codebooks may comprise noise codebooks as described in the article by M. Schroeder, et al. or learning codebooks learned by a vector quantizing algorithm (VQ). Instead of the LPC analyzer, another analyzing process such as a BURG process for extracting a spectral parameter may be employed. Furthermore, other parameters such as PARCOR (partial correlation) coefficients may be employed, rather than the LPC coefficients.

While preferred embodiments of the present invention have been described using specific terms, such description is for illustrative purposes only, and it is to be understood that changes and variations may be made without departing from the spirit or scope of the following claims.

What is claimed is:

1. A voice coder comprising:

speech analyzing means for analyzing a speech signal having a predetermined frame length to generate a short-term prediction code representing frequency characteristics of the speech signal;

an adaptive codebook for storing adaptive code vectors;

long-term predicting means for effecting long-term prediction to search for a delay code representing the periodicity of said speech signal using said short-term prediction code, and to search for an adaptive code vector corresponding to the delay code;

an excitation codebook for storing excitation vectors which are quantized codes representing residual signals after the long-term prediction;

excitation codebook searching means for searching said excitation codebook to determine an optimum quantized code using said short-term prediction code, and to determine an excitation vector corresponding to the optimum quantized code; and gain codebook searching means for determining a quantized gain vector representing quantized gain of said adaptive code vector and said excitation vector using said short-term prediction code;

said gain codebook searching means comprising:

a plurality of gain codebooks each for storing quantized gains corresponding to one of a plurality of searching ranges divided by predetermined ranges with respect to the value of a searching parameter; and gain codebook selecting means for selecting one of said gain codebooks depending on the value of the searching parameter;

wherein an optimum quantized gain is searched for to determine a gain code using the gain codebook selected by said gain codebook selecting means and said short-term prediction code.

2. The voice coder according to claim 1, wherein said speech analyzing means comprises a linear predictive coding analyzer for calculating a linear predictive coding coefficient.

3. The voice coder according to claim 1, further comprising a weighting circuit for weighting said speech signal for auditory sensation based on said short-term prediction code.

4. The voice coder according to claim 1, further comprising a multiplexer for multiplexing said short-term prediction code, said delay code, said optimum quantized code and said gain code into a transmission signal.

5. The voice coder according to claim 1, wherein said searching parameter is extracted from said delay code.

6. The voice coder according to claim 5, wherein the number of said gain codebooks included in said gain codebook searching means is two and each of said gain codebooks is corresponding to one of two searching ranges divided depending on whether a code delay value corresponding to said delay code is larger or smaller than a predetermined value.

7. The voice coder according to claim 5, further comprising a multiplexer for multiplexing said short-term prediction code, said delay code, said optimum quantized code and said gain code into a transmission signal.

8. The voice coder according to claim 1, wherein said searching parameter is extracted from an energy quantized code representing a quantized energy of said speech signal, said gain codebook searching means comprising energy quantizing means for quantizing the energy of said speech signal to generate said energy quantized code.

9. The voice coder according to claim 8, wherein said speech signal whose energy is to be quantized is a signal which is weighted for auditory sensation.

10. The voice coder according to claim 8, wherein the number of said gain codebooks included in said gain codebook searching means is two and each of said gain codebooks is corresponding to one of two searching ranges divided depending on whether a coded energy value corresponding to said energy quantized code is larger or smaller than a predetermined value.

11. The voice coder according to claim 8, further comprising a multiplexer for multiplexing said short-term prediction code, said delay code, said optimum quantized code, said gain code and said energy quantized code into a transmission signal.

12. The voice coder according to claim 1, wherein said searching parameter is extracted from an energy quantized code representing a quantized energy of said speech signal and said delay code, said gain codebook searching means comprising energy quantizing means for quantizing the energy of said speech signal to generate said energy quantized code.

13. The voice coder according to claim 12, wherein the number of said gain codebooks included in said gain codebook searching means is two and each of said gain codebooks is corresponding to one of two searching ranges divided depending on whether a coded energy value corresponding to said energy quantized code is larger or smaller than a first predetermined value and whether a code delay value corresponding to said delay code is larger or smaller than a second predetermined value.

14. The voice coder according to claim 12, further comprising a multiplexer for multiplexing said short-term prediction code, said delay code, said optimum quantized code, said gain code, and said energy quantized code into a transmission signal.

15. A voice coding system comprising said voice coder according to claim 4 and a voice decoder for decoding said transmission code, said transmission code containing said searching parameter;

said voice decoder comprising a demultiplexer for extracting at least said searching parameter from said transmission code, and gain calculating means for calculating gains of the adaptive code vector and the excitation vector;

said gain calculating means comprising a plurality of decoding gain codebooks which are identical to the gain codebooks in said gain codebook searching means, second gain codebook selecting means for selecting one of said decoding gain codebooks depending on the value of said searching parameter, and gain decoding means for decoding the gains of the adaptive code vector and the excitation vector using the decoding gain codebook selected by said second gain codebook selecting means.

16. A voice coding system comprising said voice coder according to claim 7 and a voice decoder for decoding said transmission code, said voice decoder comprising a demultiplexer for extracting at least said delay code and said gain code from said transmission code, and gain calculating means for calculating gains of the adaptive code vector and the excitation vector;

said gain calculating means comprising a plurality of decoding gain codebooks which are identical to the gain codebooks in said gain codebook searching means, second gain codebook selecting means for selecting one of said decoding gain codebooks depending on said delay code, and gain decoding means for decoding the gains of the adaptive code vector and the excitation vector using the decoding gain codebook selected by said second gain codebook selecting means.

17. A voice coding system comprising said voice coder according to claim 11 and a voice decoder for decoding said transmission code, said voice decoder comprising a demultiplexer for extracting at least said gain code and said energy quantized code from said transmission code, and gain calculating means for calculating gains of the adaptive code vector and the excitation vector;

said gain calculating means comprising a plurality of decoding gain codebooks which are identical to the gain codebooks in said gain codebook searching means, second gain codebook selecting means for selecting one of said decoding gain codebooks depending on said energy quantized code, and gain decoding means for decoding the gains of the adaptive code vector and the excitation vector using the decoding gain codebook selected by said second gain codebook selecting means.

18. A voice coding system comprising said voice coder according to claim 14 and a voice decoder for decoding said transmission code, said voice decoder comprising a demultiplexer for extracting at least said energy quantized code, said delay code, and said gain code from said transmission code, and gain calculating means for calculating gains of the adaptive code vector and the excitation vector;

said gain calculating means comprising a plurality of decoding gain codebooks which are identical to the gain codebooks in said gain codebook searching means, second gain codebook selecting means for selecting one of said decoding gain codebooks depending on said energy quantized code and said delay code, and gain decoding means for decoding the gains of the adaptive code vector and the excitation vector using the decoding gain codebook selected by said second gain codebook selecting means.

* * * * *